United States Patent
Niskanen et al.

(10) Patent No.: US 11,640,654 B2
(45) Date of Patent: May 2, 2023

(54) IMAGE PROCESSING METHOD AND APPARATUS

(71) Applicant: VISIDON OY, Oulu (FI)

(72) Inventors: Matti Niskanen, Oulu (FI); Markus Turtinen, Oulu (FI)

(73) Assignee: VISIDON OY, Oulu (FI)

( * ) Notice: Subject to any disclaimer, the term of this patent is extended or adjusted under 35 U.S.C. 154(b) by 115 days.

(21) Appl. No.: 17/081,231

(22) Filed: Oct. 27, 2020

(65) Prior Publication Data
US 2021/0125318 A1 Apr. 29, 2021

(30) Foreign Application Priority Data
Oct. 29, 2019 (GB) .................................. 1915640

(51) Int. Cl.
*G06F 18/22* (2023.01)
*G06T 5/00* (2006.01)
*G06T 5/40* (2006.01)

(52) U.S. Cl.
CPC .............. *G06T 5/009* (2013.01); *G06F 18/22* (2023.01); *G06T 5/002* (2013.01); *G06T 5/40* (2013.01)

(58) Field of Classification Search
CPC ........... G06T 5/009; G06T 5/002; G06T 5/40; G06T 5/003; G06T 5/50;
(Continued)

(56) References Cited

U.S. PATENT DOCUMENTS 6,650,774 B1 * 11/2003 Szeliski ................. G06T 5/008
382/274
2009/0245684 A1 * 10/2009 Makii ...................... G06T 5/50
382/276
(Continued)

FOREIGN PATENT DOCUMENTS

CN 105227858 B * 3/2019
EP 2 175 635 4/2010
(Continued)

OTHER PUBLICATIONS

Combined Search and Examination Report for GB1915640.5 dated Dec. 17, 2019, 5 pages.

*Primary Examiner* — Matthew C Bella
*Assistant Examiner* — Kathleen M Broughton
(74) *Attorney, Agent, or Firm* — Nixon & Vanderhye PC

(57) ABSTRACT

A method of image processing converts images of different brightness to a common brightness range, the images representing at least partly the same scene. One of images including a local block with movement is selected for forming a composed image from the images. One or more corresponding blocks corresponding to the local block are determined in the images. Each of said one or more corresponding blocks is weighted with at least one of the following: similarity with respect to the local block, a distance from a location of the local block, saturation of the one or more corresponding blocks, and noise of the one or more corresponding blocks. The local block and at least one of the one or more corresponding blocks are combined, or the local block is replaced by at least one of the one or more corresponding blocks based on the weighting for forming the composed image from the images.

20 Claims, 3 Drawing Sheets

(58) Field of Classification Search
CPC . G06T 2207/20021; G06T 2207/20212; G06T 2207/10144; G06T 2207/20221; G06T 7/337; G06K 9/6215; G06V 10/30; G06V 10/76

See application file for complete search history.

(56) References Cited

U.S. PATENT DOCUMENTS

| | | | | |
|---|---|---|---|---|
| 2010/0091119 | A1* | 4/2010 | Lee | H04N 5/23248 |
| | | | | 348/208.4 |
| 2012/0026317 | A1* | 2/2012 | Nakahira | H04N 5/2628 |
| | | | | 348/92 |
| 2013/0287296 | A1* | 10/2013 | Li | G06T 5/50 |
| | | | | 382/167 |
| 2015/0049215 | A1* | 2/2015 | Kuang | H04N 5/2353 |
| | | | | 382/165 |
| 2015/0312463 | A1* | 10/2015 | Gupta | H04N 5/2355 |
| | | | | 348/239 |
| 2017/0310901 | A1* | 10/2017 | Sheikh | G01S 3/00 |
| 2017/0347088 | A1* | 11/2017 | Barron | H04N 13/271 |
| 2019/0260937 | A1* | 8/2019 | Kobayashi | G06T 7/248 |

FOREIGN PATENT DOCUMENTS

| | | | | |
|---|---|---|---|---|
| KR | 101661215 B1 | * | 9/2016 | |
| WO | WO-2015195317 A1 | * | 12/2015 | G06T 19/20 |

* cited by examiner

IMAGE PROCESSING METHOD AND APPARATUS

This application claims priority to GB Patent Application No. 1915640.5 filed Oct. 29, 2019, the entire contents of which are hereby incorporated by reference.

FIELD

The invention relates to a method of image processing and an apparatus using the method.

BACKGROUND

Digital images of the same scene but with different brightness may have blocks or local areas, which contain movement that causes blur. The blur may be reduced by combining the images by taking pixels of the movement from the darker image which leaves noise in the pixels of the movement. Alternatively, the blur may be reduced by combining the images by taking pixels of the movement from the brighter image, but in this case the pixels of the movement may be saturated.

Hence, there is a need to improve the image processing.

BRIEF DESCRIPTION

The present invention seeks to provide an improvement in the image processing.

The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of two images, which are used to form a composed image;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

When a digital image is captured, each pixel gathers light, the intensity of which is converted into a digital number. The number is within a dynamical range of the imaging sensor, the dynamical range being expressed using a certain number of bits. At one end of the dynamical range there are the darkest pixels and at the other end of the dynamical range there are the brightest pixels. By lengthening the duration of the exposure or having a larger aperture it is possible to increase the intensity received by each pixel.

However, when the intensity is too strong, pixels saturate i.e. they cannot carry information on the intensity they receive. On the other hand, when the intensity is too low, pixels become quantized which is observed as noise. Pixels in a digital image can be considered to count incoming photons. Because radiation of photons itself is a random process, a signal-to-noise ratio can be improved by collecting more photons. Thus, an underexposed image contains less information compared to a well exposed image of the same target or scene.

In addition to the saturation and noise, images may be blurred because of movement. All these features which decrease the image quality should be compensated.

Figure 1:
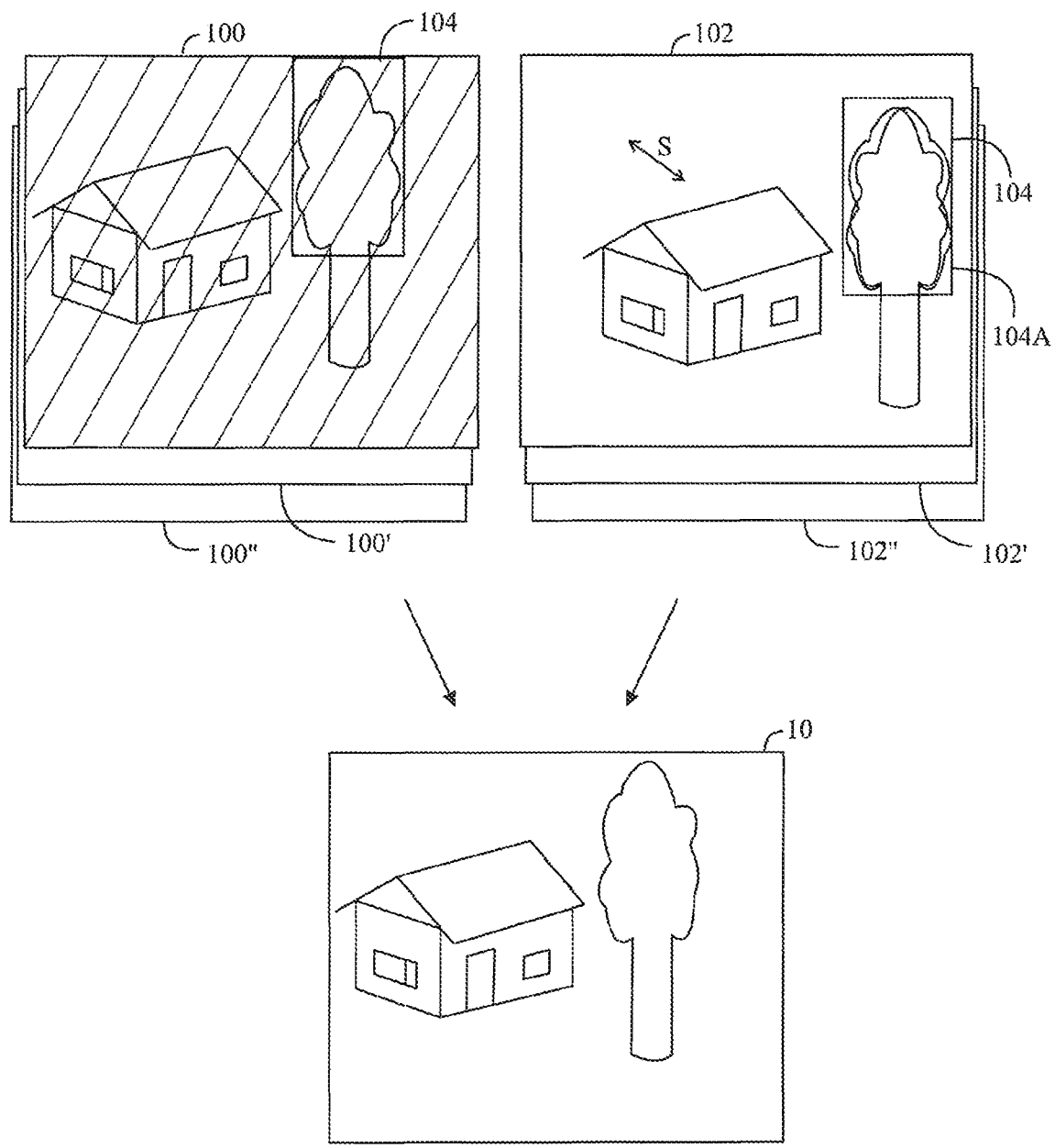

FIG. 1 illustrates an example of two images 100, 102, where the image 100 is darker, i.e. the image 100 has a lower brightness than the image 102. In general, the number of the images may be two or more. The lower brightness is illustrated with a hatch pattern. The brightness is based on a visual perception and refers, in a certain manner, to lightness or darkness of an image as a whole. On the other hand, the brightness can be considered a mean or average of values of the red, green, and blue in the RGB (Red-Green-Blue) color coordinate system. An image having a low brightness may be captured when using a short exposure or a small aperture. Additionally or alternatively, an image having a low brightness may be captured in a low illumination of a scene or target of the image. In the example of FIG. 1, the image 102 may have a longer exposure than an exposure of the image 100, for example.

The image processing apparatus 200 comprises an image processing electric circuit system, which converts the images 100, 102 to a common brightness range. At least one image 102 has initially a higher brightness than at least one other image 100 as shown in the example of FIG. 1. The conversion to the common brightness may be performed by converting intensity values of images 100, 102 to a common brightness range. That is, the brightness does not need to be exactly the same as long as the brightness is about the same, i.e. within a predetermined range. The predetermined range may be decided by a person skilled in the art on the basis of his/her experience, tests, simulation or his/her knowledge of theory. The predetermined range may be a general range, or it may be decided for each application or each group of images separately.

The images 100, 102 represent at least partly the same scene at different moments, although they may or may not be shifted with respect to each other. The images 100, 102 illustrate a shift S between the images. The shift S is shown with an arrow in the image 102. In addition to a global shift, motion between images can be rotation, scaling, shearing, perspective projection etc., which, per se, are known to a person skilled in the art.

The image processing apparatus 200 selects one of images 100, 102, which includes a local block 104A with movement, for forming a composed image 10 from the images 100, 102. The selected image is thus used as a base from which the composition may start. In the example of FIG. 1, the selected image is the image 102. In general, more than one of the images 100, 102 may include local movement. In the example of FIG. 1, the movement may be clear in the image 102 because of a longer exposure than an exposure of the image 100, for example. The movement causes blur. In the image 102, the leaves and the outer contour of the tree may be blurred. Additionally, there is a higher probability that pixels are saturated in the brighter image 102 than in the darker image 100. A pixel of an image is saturated at a threshold above which an increasing intensity of optical radiation hitting a corresponding pixel of a camera, which records said image, causes a constant output. The constant output is typically the maximum output. Saturation may result in undesirable artifacts in the images.

The image processing electric circuit system determines one or more corresponding blocks 104 of the images 100, 102, the corresponding blocks 104 corresponding to the local block 104A of said one 102 of the images 100, 102 on the basis of their visual information. The corresponding blocks 104 may be in the one or more images 100 other than said one 102 of the images 100, 102. Alternatively or additionally, the one or more corresponding blocks 104 may also be found in the same image 102 as the local block 104A (see FIG. 3). A block of an image, such as either one of the one or more corresponding blocks 104 or the local block 104A, comprises one or more pixels.

The image processing electric circuit system forms the corresponding block 104 (or refines the local block 104A) by taking weighted average of the corresponding blocks 104 from different images. The image processing electric circuit system then weights each of said corresponding blocks 104 with at least one of the following: similarity with the local block 104A, a distance from a location of the local block 104A, saturation, and noise of the corresponding blocks 104. In an embodiment, the noise of the corresponding blocks 104 may be compared with noise of the local block 104A. The location of the local block 104A may be determined in a coordinate system of an image 100 different from the image 102 including the local block 104A.

The image processing electric circuit system combines the local block 104A and at least one of the corresponding blocks 104, or replaces the local block 104A by at least one of the corresponding blocks 104 based on the weighting for forming the composed image 10 from the images 100, 102. In this manner, the new image 10 is a combination of the images 100, 102 such that disturbance, such as blur caused by the movement and the saturation, is minimized, while trying to maximize signal-to-noise ratio and/or to minimize noise.

In an embodiment, the composed image 10 may be formed by combining the plurality of images 100, 102 when combining the local block 104A and the at least one of the one or more corresponding blocks 104, or replacing the local block 104A by the at least one of the one or more corresponding blocks 104.

This kind of composition on the basis of weighting of the blocks having movement can be considered a trilateral filtering which is edge-preserving and noise reducing.

The local block 104A and the corresponding blocks 104 may have noise, which may be divided in several types. Gaussian noise, which may also be called thermal noise, comes from the camera that captured the image. Salt-and-pepper noise has dark pixels in bright regions and bright pixels in dark regions. Salt-and-pepper noise may also be called or spike noise. Shot noise, in turn, is caused by quantum fluctuations and it can be included the Gaussian noise because of it statistical properties. The shot noise and thus the Gaussian noise may include dark current in the image sensor. Because the images are in a digital form, the conversion into the digital form causes quantization noise. Additionally, the image 100, 102 may have periodic noise, row noise, and/or column noise, for example.

Figure 2:
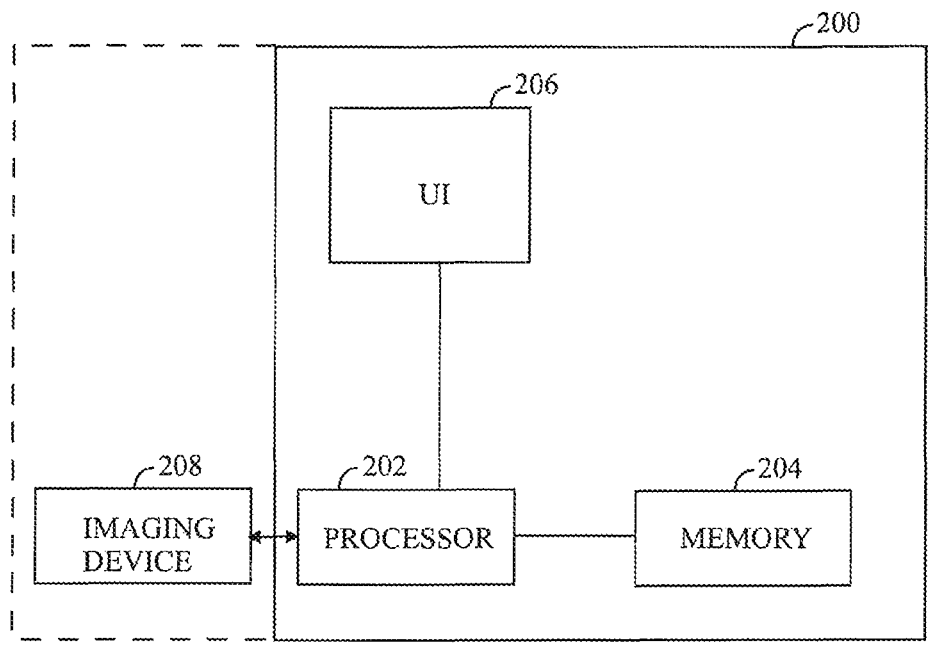
FIG. 2 illustrates an example of an image processing apparatus.

FIG. 2 illustrates an example of the image processing apparatus 200, which may comprise one or more processors 202 and one or more memories 204 including at least one computer program code. The one or more processors 202, the one or more memories 204 and the at least one computer program code cause the image processing apparatus 200 at least to perform image processing method steps, which include the conversion of the images 100, 102 to the common brightness range, the determination of the corresponding blocks 104, the weighting of each of said corresponding blocks 104, and the combination or replacement relating to the local block 104A and the corresponding blocks 104. The image processing apparatus 200 may comprise also a user interface 206, which may comprise a screen and a keyboard, and/or a touch screen, for example. Additionally, the image processing apparatus 200 may comprise an imaging device 208. The imaging device 208 may be a camera or the like, which captures or forms the images.

Figure 3:
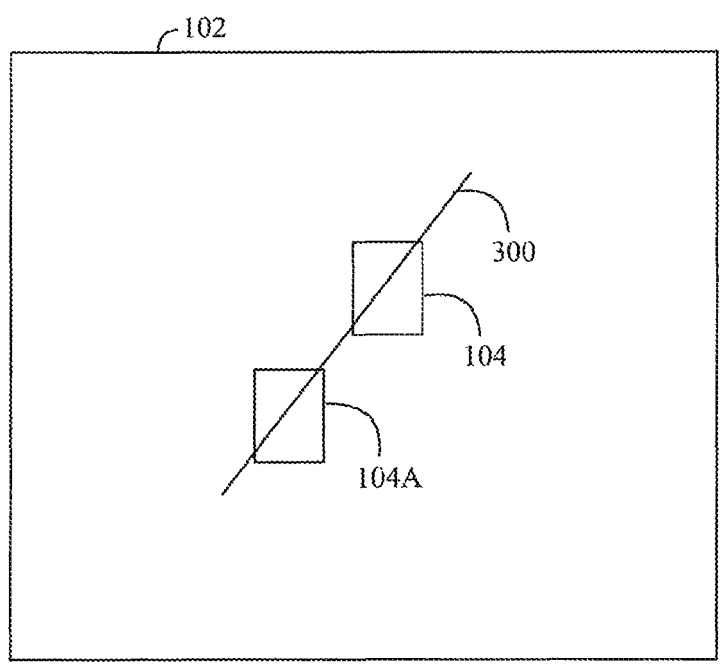
FIG. 3 illustrates an example where a local block and a corresponding block are in the same image.

FIG. 3 illustrates an example where the corresponding block 104 is in the same image 102 as the local block 104A. If an image has a shape 300 that is larger than the local block 104A (the corresponding block has the same size as the local block), the same shape can also be found outside the local block 104A. The shape 300 may continue in an unchanged manner or it may appear repeatedly in the image 102. The saturation or movement of the shape 300 may differ in different locations of the image 102, which may sometimes be utilized.

In an embodiment, the image processing apparatus 200 may use the coordinate system of the image 100 having a lowest brightness to determine locations in the images. Thus, a location for the local block 104A and a location of the one or more corresponding blocks 104 may be determined in the coordinate system of the image 100.

In an embodiment, the image processing apparatus 200 may convert the brightness of the images to the common brightness range by increasing brightness of dark images. If a dynamical range of the image 100 is 10 bits and it is brightened eight times, for example, which corresponds to an exposure with eight times more light, the values of pixel intensities are multiplied by eight. The dynamical range of the pixels of the initially darker image 100 is now 14 bits. In this case, it may be so that the pixels of the initially darker image 100 are quantized and the pixels of the initially brighter image 102 may be saturated. However, if the quantized pixels and the saturated pixels are not completely the same, it is possible to have an image without or with limited saturation and quantization by combining the images.

In an embodiment, the image processing apparatus 200 may form the similarity with the local block 104A by computing the similarity between brightness of the local block 104A and each of the one or more corresponding blocks 104. Additionally or alternatively, the image processing apparatus 200 may form the similarity with the local block 104A by computing the similarity between colors of the local block 104 and each of the one or more corresponding blocks 104. Additionally or alternatively, the image processing apparatus 200 may form the similarity with the local block 104A by computing the similarity of a distribution of brightness between the local block and one of the corresponding blocks.

In an embodiment, the image processing apparatus 200 may compute histograms of values of pixels of each of the one or more corresponding blocks 104 and the local block 104A, and form the similarity based on a comparison of the histograms. A histogram can be used to show a distribution of numerical data of an image or a block of an image. The similarity may also be determined on the basis of dissimilarity.

The similarity may also be based on scale invariant feature transform (SIFT) algorithm. The similarity may further be determined using a plurality of method such as Pearson correlation, Tanimoto measure, Spearman's ρ, Kendall's τ, correlation, and/or Shannon/Rényi/Tsallis mutual information, for example. The dissimilarity may be measured using L1 or L2 norm, incremental sign distance, intensity-ratio variance, intensity-mapping-ratio variance, rank distance, joint entropy, and/or exclusive F-information. These methods may also measure noise and blurring as well as to intensity and geometric changes. The similarity may estimate the probability that the blocks represent the same target, when taking known or estimated amount of noise into an account.

In an embodiment, the image processing apparatus 200 may weight said each of the one or more corresponding blocks 104 by values, which decrease with an increasing distance from the location of the local block 104A.

In an embodiment, the image processing apparatus 200 may weight said one or more corresponding blocks 104 by values, which decrease with increasing noise.

In an embodiment, the image processing apparatus 200 may estimate noise of the one or more corresponding blocks 104 and the local block 104A based on a gain of a sensor, which captured the images. The gain of the sensor refers to amplification of the intensity values of the pixels, for example. Gain may also be taken into account in an embodiment, when different images are adjusted to be at a same intensity level. When the values of pixels of an image are multiplied by a value n, also the noise will increase with the value n. In this multiplication, the signal-to-noise ratio will remain constant. On the other hand, if the number of photons is increased by the value n, the photon noise will increase by a square root of the value n, which increases the signal-to-noise ratio by the square root of the value n. That is, the same brightness achieved with the gain as with an increase of a corresponding optical radiation power will result in an increase of noise by the square root of the increase/gain n.

Additionally or alternatively, the image processing apparatus 200 may estimate noise of the one or more corresponding blocks 104 and the local block 104A based on one or more image transformations performed to the image. The image transforms may be geometric image transforms, for example. The image transformation may refer to a geometrical distortion and/or a combination of images, for example.

In an embodiment, the image processing apparatus 200 may estimate noise of the one or more corresponding blocks 104 and the local block 104A based on a pre-gain performed to the images 100, 102 prior to entering the method of this application.

In an embodiment, the image processing apparatus 200 may estimate noise of the one or more corresponding blocks 104 and the local block 104A based on noise, which depends on a location in the images.

In an embodiment, the image processing apparatus 200 may estimate noise of the one or more corresponding blocks 104 and the local block 104A based on image fusion.

Noise of an image may be reduced, when at least two images have been fused. When combining the images, at least one of the images may have been adjusted (contrast may have been changed, for example), which may have increased a gain of a pixel i.e. a pixel-specific gain may have been altered. Alternatively or additionally, a possible vignetting caused by a lens and/or any other physical disturbance or deformation caused by optical components of an image capturing device or environment (turbulence of atmosphere) may have been adjusted by a multiplication of pixel values which changes the pixel-specific gain.

In an embodiment, the image processing apparatus 200 may select an image 102, which has the best information, where the best information may mean that the image 102 has the greatest brightness without saturation or with least saturation. In an embodiment, the image processing apparatus 200 may select an image 102, which has the greatest brightness among the images 100, 102, as said one of images 100, 102. In this embodiment, the local block 104A is selected to be in an image, which is the brightest image among the images and includes the movement. Here the brightest image may be a non-saturated image.

In an embodiment an example of which is illustrated in FIG. 1, the image processing apparatus 200 may form a bright image 102 by combining images having a higher brightness than an image, which has a lowest brightness, before converting the images 100, 102 to the common brightness range. In the example of FIG. 1, the image 102 may have been formed as a combination of bright images 102', 102", which are brighter than the dark image 100.

In an embodiment an example of which is illustrated in FIG. 1, the image processing apparatus 200 may combine a plurality of images of a lower brightness than an image, which has a highest brightness, before converting the images 100, 102 to the common brightness range. In the example of FIG. 1, the image 100 may have been formed as a combination of dark images 100', 100", which are darker than the image 102.

In an embodiment, a plurality of dark images 100" and a plurality of bright images 102" may be used separately. The formation of the corresponding blocks 104 may automatically combine information from multiple dark images. The formation of corresponding blocks 104 may automatically combine information from multiple bright images.

In an embodiment, the image processing apparatus 200 may register the images 100, 102 before converting the images to the common brightness range. In this manner, the images 100, 102 are aligned to each other. The shift S may be utilized in the alignment. The coordinate system of the images is unified, and a location of an area of the local block 104A becomes the same in each of the images 100, 102.

In an embodiment, the corresponding blocks 104 may originate from several different input images, which may have been captured with different settings. Thus, in addition to spatial distance from the local block 104A and similarity of blocks, information content (noise and saturation) of each the corresponding blocks 104 may affect the weighting. In general, input images may be captured with the same or different settings (brightness).

At extreme, non-moving and non-saturated areas of images are obtained merely from at least one bright image 102", which produces a better signal-to-noise ratio for these areas than a darker image.

If any of the corresponding blocks 104 contains a lot of saturated pixels, several dark images 100" may be combined.

In an embodiment, a dark image 100 may be used as a reference. As an effect of this kind of filtering, if target in the block 104 is moving, but is non-saturated, the at least one corresponding block 104 may be taken from at least one bright image 102 where it is at a slightly different location in addition to shift S of a local motion. The result of a combination of the images 100, 102 is that a signal-to-noise level comes from the bright image 102, but a location of a moving object is based to the dark image 100. If the corresponding block 104 is attached to pixels that are saturated in the bright image 102, but non-saturated in dark image 100, this will result in a continuous object. Its location corresponds to that in the dark image 100, without saturated pixels, where pixels are taken partly from a bright image 102 (less noisy), and partly from a dark image 100. Also, these pixels that have been taken from the dark image 100 are rather bright (as these are saturated in the bright image 102), so noise is not as high in these pixels as it would be in the corresponding block 104 of the dark image 100.

There can be cases where a corresponding block 104 of a dark image 100 is not visible in a bright image 102 (with good enough similarity). Then, the bright image 102 cannot be utilized even if area of the corresponding block 104 would be non-saturated in an intensity level of the bright image 102. In an embodiment, a location of each single moving object may vary, either coming from a dark or bright image 100, 102, where the object may move image-specifically. An algorithm may prefer an image that contains a best or optimum information, which may mean that the image is bright but the pixels are non-saturated, for example. Irrespective of a location, areas of these larger moving objects in the corresponding blocks 104 of a plurality of images may be partly combined (see FIG. 3 although it refers to one image only).

In images, there may be a whole target/object that moves. Then, when the shift S has been compensated between a plurality of images, an outline of the target/object may correspond well to each other in different images. However, in an area surrounded by the outline of the target/object there may be pixel values that differ in different images 100, 102 because of movement. The target/object may be divided in blocks like blocks 104A, 104, which may contain one pixel, 2×2 pixels, 8×8 pixels, 5×9 pixels or the like. Each of the blocks may be filtered separately in order to have a high quality composed image 10 despite the movement.

In an embodiment, different base frames may be selected for each block 104. In an embodiment, different base locations for each of the corresponding blocks 104 may be selected. That means that some areas of the composed image 10 may come from the image 100 and some areas of the composed image 10 may come from the image 102. This can be used to avoid ghost edges of an object in the composed image 10 and to increase total quality of the composed image 10.

In an embodiment, the image processing apparatus 200 may determine noise pixel by pixel of the composed image 10, and equalize the noise of the composed image 10 by filtering. This kind of filtering may be performed by any single image based spatial filtering (like Gaussian filtering, bilateral filtering, non-local means BM3D). Alternatively, this information of pixel-by-pixel noise may be utilized in a previous step in order to adjust a weight to merge a corresponding block 104 with a local block 104A, based on a noise level of the corresponding block 104. This filtering may take known noise level into an account. As a result, the image formed as a combination of images filtered in this manner contains an equal noise level over the whole image, irrespective if the corresponding block 104 has originated from a dark or bright image, or if the corresponding block 104 is moving (when combined with one or several bright frames, for example).

In an embodiment, the image processing apparatus 200 may process images 100, 102 which are raw Bayer-pattern data. In other words, no preprocessing steps or less than usual amount preprocessing steps have been made for inputs. This facilitates the processing and estimation of the movement, helps in finding the local block 104A and the corresponding blocks 104, and helps estimating amount of noise remaining per image pixel.

In an embodiment an example of which is illustrated in FIG. 2, the image processing apparatus comprises one or more processors 202; and one or more memories 204 including computer program code. The one or more memories 204 and the computer program code are configured to, with the one or more processors 202, cause image processing apparatus at least to: convert the intensity values of the images to the common brightness range; select one of images 100, 102 including a local block 104A with movement for forming a composed image 10 from the images 100, 102; determine the corresponding blocks 104; weight each of said corresponding blocks 104 with respect to the local block 104A; and perform the combination or replacement.

Figure 4:
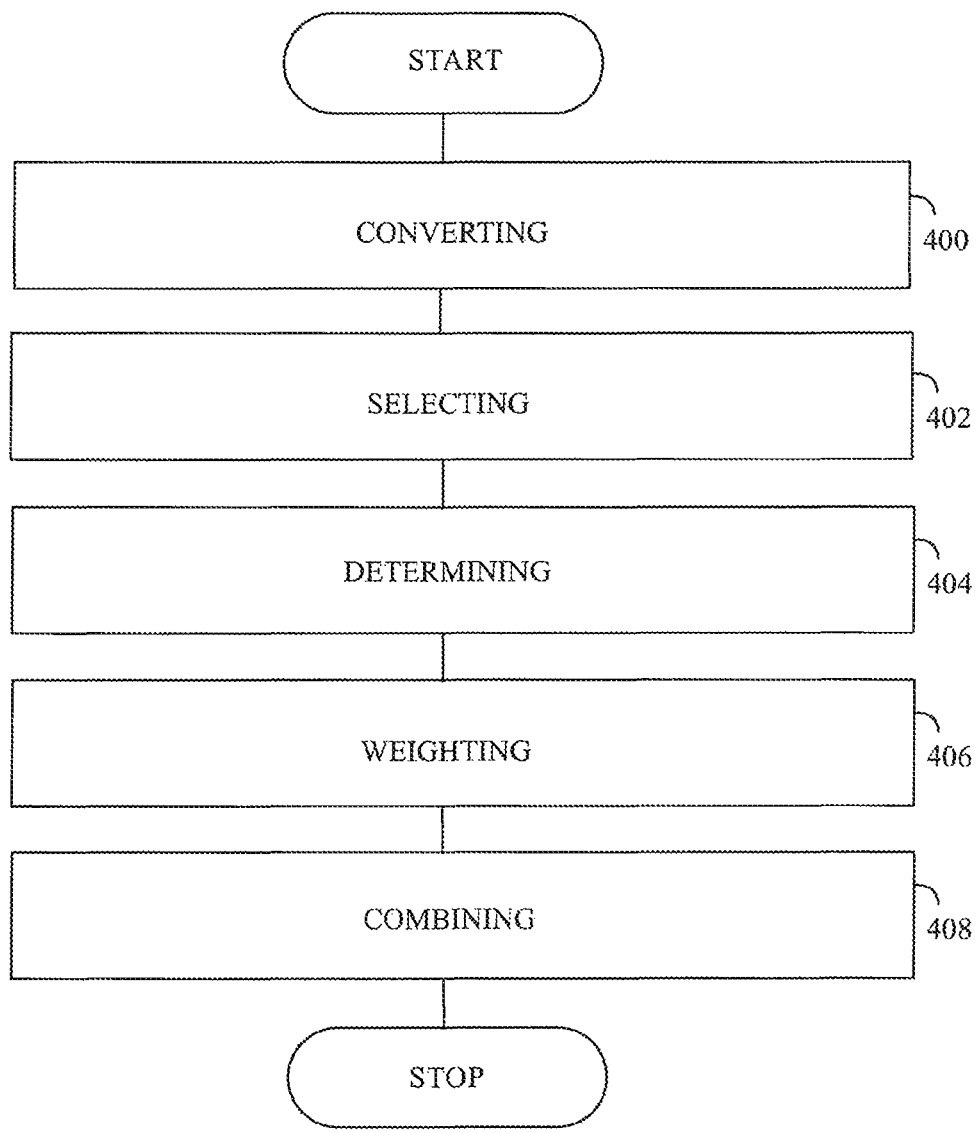
FIG. 4 illustrates of an example of a flow chart of an image processing method.

FIG. 4 presents an example of a flow chart of the image processing method. In step 400, images 100, 102 of different brightness are converted to a common brightness range, the images 100, 102 representing at least partly the same scene. In step 402, one of images 100, 102 including a local block 104A with movement is selected for forming a composed image 10 from the images 100, 102. In step 404, one or more corresponding blocks 104 to the local block 104A determined in the images 100, 102. In step 406, each of said one or more corresponding blocks 104 are weighted with at least one of the following: similarity with respect to the local block 104A, a distance from a location of the local block 104A, saturation of the one or more corresponding blocks 104, and noise of the one or more corresponding blocks 104. In step 408, the local block 104A and at least one of the one or more corresponding blocks 104 are combined, or the local block 104A is replaced by at least one of the one or more corresponding blocks 104 based on the weighting for forming the composed image 10 from the images 100, 102.

The method shown in FIG. 4 may be implemented as a logic circuit solution or computer program. The computer program may be placed on a computer program distribution means for the distribution thereof. The computer program distribution means is readable by a data processing device, and it encodes the computer program commands, and carries out the image processing.

The computer program may be distributed using a distribution medium, which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. A method of image processing, the method comprising:
converting images of different brightness to a common brightness range, the images representing at least partly the same scene;
selecting one of images including a local block with movement for forming a composed image from the images;
determining one or more corresponding blocks corresponding to the local block in the images;
forming weights for each of said one or more corresponding blocks and the local block with at least one of the following: similarity with respect to the local block, a distance from a location of the local block, saturation of the one or more corresponding blocks, and noise of the one or more corresponding blocks;
replacing the local block by a combination of at least one of the one or more corresponding blocks and the local block based on weighted averaging with the weights forming the composed image from the images.

2. The method of claim 1, further comprising forming the similarity with respect to the local block by computing at least one of the following: similarity between brightness of the local block and each of the one or more corresponding blocks, similarity between colors of the local block and each of the one or more corresponding blocks, and similarity of a distribution of brightness between the local block and each of the one or more corresponding blocks.

3. The method of claim 1, further comprising computing histograms of values of pixels of each of the one or more corresponding blocks and the local block, and forming the similarity based on a comparison of the histograms.

4. The method of claim 1, further comprising weighting said one or more corresponding blocks by values, which decrease with an increasing distance from a location of the local block.

5. The method of claim 1, further comprising weighting said one or more corresponding blocks by values, which decrease with increasing noise.

6. The method of claim 1, further comprising estimating noise of the one or more corresponding blocks and the local block based on at least one of the following: gain of a sensor that captured the images, pre-gain performed with respect to the images, noise dependent on a location, image fusion, and image transformation.

7. The method of claim 1, further comprising selecting an image that has a best information among the images, as said one of images.

8. The method of claim 1, further comprising forming an image of a high brightness by combining images having a higher brightness than an image that has a lowest brightness, before converting the images to the common brightness range.

9. The method of claim 1, further comprising forming an image of a low brightness by combining a plurality of images having a lower brightness than an image that has a greatest brightness, before converting the images to the common brightness range.

10. The method of claim 1, further comprising forming the composed image by combining the plurality of images when combining the local block and the at least one of the one or more corresponding blocks, or replacing the local block by the at least one of the one or more corresponding blocks.

11. The method of claim 1, further comprising selecting different base frame for each block.

12. The method of claim 1, further comprising registering the images before converting the images to the common brightness range.

13. The method of claim 1, further comprising determining noise pixel by pixel of the composed image, and equalizing the noise by filtering the composed image.

14. An image processing apparatus, comprising an image processing electric circuit system configured to at least:
convert images of different brightness to a common brightness range, the images representing at least partly the same scene at different times;
select one of images including a local block with movement for forming a composed image from the images;
determine one or more corresponding blocks, which correspond to the local block in said one of the images;
form weights for each of said one or more corresponding blocks and the local block with at least one of the following: similarity with the local block, a distance from a location of the local block, saturation, and noise of the one or more corresponding blocks; and
replace the local block by a combination of at least one of the one or more corresponding blocks and the local block based on weighted averaging with the weights forming the composed image from the images.

15. The image processing apparatus of claim 14, wherein the image processing electric circuit system comprises:
one or more processors; and
one or more memories including computer program code;
the one or more memories and the computer program code configured to, with the one or more processors, cause apparatus at least to at least:
convert the images to the common brightness range;
perform the selection of the one of images;
determine the one or more corresponding blocks to the local block;
weight each of said one or more corresponding blocks; and
perform the weighting using the weighted averaging and replacement.

16. The image processing apparatus of claim 14, wherein the image processing electric circuit system is further configured to at least compute histograms of values of pixels of each of the one or more corresponding blocks and the local block, and form the similarity based on a comparison of the histograms.

17. The image processing apparatus of claim 14, wherein the image processing electric circuit system is further configured to at least form the similarity with respect to the local block by computing similarity between colors of the local block and each of the one or more corresponding blocks, and/or similarity of a distribution of brightness between the local block and each of the one or more corresponding blocks.

18. The image processing apparatus of claim 14, wherein the image processing electric circuit system is further configured to at least form an image of a high brightness by combining images having a higher brightness than an image that has a lowest brightness, before converting the images to the common brightness range.

19. The image processing apparatus of claim 14, wherein the image processing electric circuit system is further configured to at least determine noise pixel by pixel of the composed image, and equalize the noise by filtering the composed image.

20. A non-transitory computer program product readable by a computer and comprising program instructions which, when executed by the computer, result in execution of operations corresponding to the method of claim 1.

* * * * *